United States Patent [19]

Kitami et al.

[11] Patent Number: 4,802,938
[45] Date of Patent: Feb. 7, 1989

[54] PROCESS FOR PRODUCING HOSES

[75] Inventors: Tetsu Kitami; Shigeru Igarashi, both of Kanagawa; Katuya Ono, Gifu, all of Japan

[73] Assignee: The Yokohama Rubber Co., Ltd., Tokyo, Japan

[21] Appl. No.: 85,229

[22] Filed: Aug. 11, 1987

Related U.S. Application Data

[63] Continuation of Ser. No. 878,689, Jun. 26, 1986, abandoned.

[30] Foreign Application Priority Data

Jun. 27, 1985 [JP] Japan .................. 60-139091

[51] Int. Cl.⁴ ...................... B29C 35/02; B29C 47/04
[52] U.S. Cl. .................... 156/149; 156/172; 156/173; 156/187; 156/244.13; 138/126; 138/141
[58] Field of Search .................. 156/149, 173, 244.13, 156/172, 187; 138/126, 137, 141, 146, 125

[56] References Cited

U.S. PATENT DOCUMENTS

| | | | |
|---|---|---|---|
| 2,525,272 | 10/1950 | Rhoton | 138/126 |
| 3,024,813 | 3/1962 | Sear et al. | 138/137 |
| 3,414,448 | 12/1968 | Harpfer | 156/149 |
| 3,599,677 | 8/1971 | O'Brien | 138/137 |
| 3,828,112 | 8/1974 | Johansen et al. | 138/126 |
| 3,883,384 | 5/1975 | Hopkins | 156/244.13 |

*Primary Examiner*—Caleb Weston
*Attorney, Agent, or Firm*—Finnegan, Henderson, Farabow, Garrett & Dunner

[57] ABSTRACT

A process for producing hoses of laminated construction having a plastic inner tube is disclosed which comprises:- (a) extruding a thermoplastic resin on a mandrel to form an inner tube with a predetermined thickness, the mandrel being preformed of a thermoplastic resin or rubber and releasable from the inner tube, (b) laminating an outer tube integrally on the inner tube by extrusion of an unvulcanized rubber to form an integral hose body, (c) vulcanizing the hose body, (d) removing the mandrel from the vulcanized hose body. This hose is characterized by high resistance to load of impulse.

8 Claims, 2 Drawing Sheets

PROCESS FOR PRODUCING HOSES

This application is a continuation of application Ser. No. 06/878,689, filed June 26, 1986, abandoned.

BACKGROUND OF THE INVENTION

1. Field of the Invention

This invention relates to a process for the production of hoses having a plastic inner tube of reduced thickness.

2. Prior Art

Generally, hoses of laminated construction and smoothed inner periphery comprise an inner tube of thermoplastic resin, a rubber outer tube, a reinforcement and a rubber cover integrally superimposed one on another. Known hoses have been produced by inserting a mandrel through an inner tube performed of thermoplastic resin, and subsequently laminating a rubber outer tube, a reinforcement and a rubber cover in that order on the inner tube carried by the mandrel.

The prior art process however was encountered with the following problems:

1. Frequent flattening and kinking of the inner tube due to its thickness being small in the range of 50 to 800 microns, resulting in creased tube.
2. Impaired inner periphery of the inner tube due to frictional contact with the mandrel.
3. Limited external diameter and increased tolerance of the mandrel to fit smoothly into the preformed inner tube, leading to creased mandrel due to shrinkage during subsequent vulcanization.

SUMMARY OF THE INVENTION

It is therefore the primary object of the present invention to provide an improved process for the production of pressure hoses of laminated construction having a plastic inner tube of reduced thickness which will eliminate the above drawbacks of the prior art and will provide hoses of excellent impulse resistance characteristics.

This and other objects and advantages of the invention will be better understood from the following detailed description taken in connection with the accompanying drawings in which a preferred embodiment of the invention is exemplified.

According to the invention, there is provided a process for the production of hoses having a plastic inner tube of reduced thickness which comprises:

(a) extruding a thin layer of thermoplastic resin onto a mandrel to form an inner tube of a predetermined thickness, the mandrel being preformed of thermoplastic resin or rubber and releasable from the inner tube;

(b) laminating an outer tube of unvulcanized rubber by extrusion over the inner tube to form an integral hose body;

(c) vulcanizing the hose body; and (d) removing the mandrel from the vulcanized hose body.

DETAILED DESCRIPTION OF THE PREFERRED EMBODIMENT

Hoses according to the present invention may be effectively applied to the transportation or circulation of fuel oils, refrigerants and hydraulic fluids.

Figure 1A:
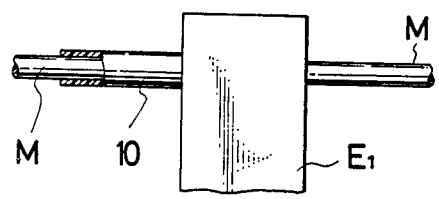
FIG. 1A through FIG. 1D are each side elevational views explanatory of a series of steps embodying the process of the present invention.

In carrying out the invention, a substantially circular, elongate mandrel M is allowed to pass through an extruder E1 at a predetermined speed of travel, as shown in FIG. 1A, by suitable driving means (not shown). A thin layer of a thermoplastic resin is extruded peripherally on the mandrel M and thus forms an inner tube 10.

Eligible thermoplastic resins are polyamide, polyester and the like. The inner tube 10 should preferably have a thickness in the range between 50 and 800 microns.

Mandrels eligible for the invention are those made of thermoplastic resins or rubbers which are flexible and resistant to thermal deformation during subsequent vulcanization, examples of which include polyamide, polyester and the like, and vulcanizates including ethylene-propylene terpolymer rubber (EPT), butyl rubber (IIR) and the like. The mandrel M needs be eventually removed from the inner tube 10 and therefore may preferably be precoated with a releasant such as silicone resin or fluoroplastic resin.

Figure 1B:
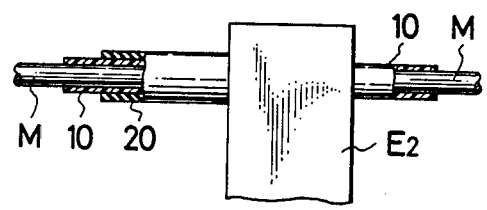

The inner tube-carrying mandrel M successively enters an extruder E2 as illustrated in FIG. 1B at which time an unvulcanized rubber is laminated over the inner tube 10 to thereby form an outer tube 20. Eligible rubbers to be here used include nitrile rubber (NBS), chlorosulfonated polyethylene (CSM), epichlorohydrin rubber (CHC and CHR), chlorinated polyethylene (CM), ethylene-propylene rubber (EPM and EPDM), butyl rubber (IIR), chlorobutyl rubber (CI-IIR) and the like.

In order to facilitate bonding between the inner tube 10 and the outer tube layer 20, the inner tube may be coated with an adhesive such as polyurethane resin, chlorinated rubber, phenol resin or the like. Alternatively, the unvulcanized rubber may be conveniently blended with an adhesion promotor such as silicone resin, phenol resin or the like.

Figure 1C:
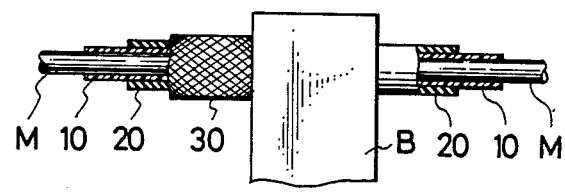

A reinforcement 30 is laminated over the outer tube 20 in timed relation to the rate of extrusion of the latter. The reinforcement 30 may be made by braiding a textile yarn over the tube 20 on a braider B (FIG. 1C), or by winding a fabric strip spirally over the same on a wrapping machine (not shown). Eligible textile yarns are those of nylon, polyester, vinylon, rayon and the like.

Figure 1D:
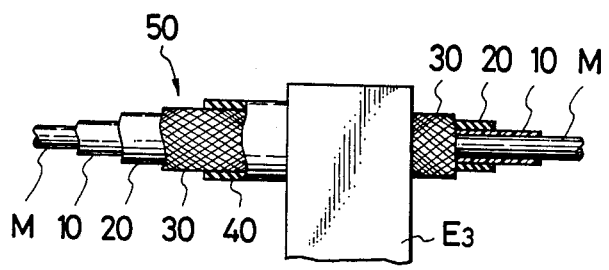

A cover 40 is laminated over the reinforcement 30 as it comes out of the extruder E2. This lamination may be effected by extrusion of an unvulcanized rubber material with use of an extruder E3 (FIG. 1D), thereby giving a hose body 50 which will be subsequently vulcanized. Examples of the unvulcanized rubber material include chlorinated polyethylene (CM), chlorosulfonated polyethylene (CSM), ethylene-propylene rubber (EPM and EPDM), butyl rubber (IIR), chlorobutyl rubber (CI-IIR) and the like.

Figure 2:
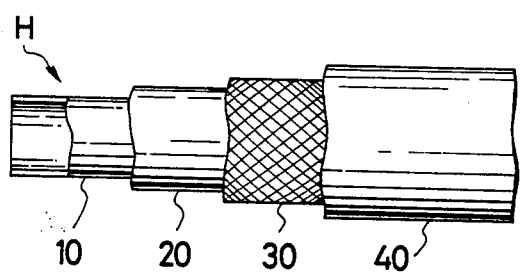
FIG. 2 is a segmentary, side elevational view of a hose constructed in accordance with the invention, the hose being shown telescoped for clarity of illustration.

The hose body 50 after being covered with lead or wrapping fabric is vulcanized under selected conditions in a reactor (not shown) and then subjected to a lead peeler or an unwrapping machine (neither shown) to remove the covering material used. The mandrel M is afterwards pulled out of the vulcanized hose body by a stripping machine (not shown), whereupon there is obtained a hose product H illustrated in FIG. 2.

The invention will now be further described by way of the following examples.

PROCESS FOR MANUFACTURE OF TEST HOSES ranging from 135,000 to 221,000. The controls of Comparison Examples 1 and 2 fractured after only 36,000 cycles of impulse and revealed sharp cuts.

TABLE

| Sample No. | Comparison Example 1 | Comparison Example 2 | Invention Example 1 | Invention Example 2 |
|---|---|---|---|---|
| 1 | 3,200 | 3,600 | 140,000 | 221,000 |
| 2 | 1,070 | 36,000 | 159,000 | 213,000 |
| 3 | 12,000 | 2,000 | 156,000 | 191,000 |
| 4 | 2,080 | 25,000 | 184,000 | 204,000 |
| 5 | 20,000 | 3,500 | 160,000 | 210,000 |
| 6 | 1,020 | 2,400 | 135,000 | 221,000 |
| cycles of impulse requied for fracture | 1,020–20,000 | 2,000–36,000 | 135,000–184,000 | 191,000–221,000 |
| resistance to fracture | poor | poor | excellent | excellent |
| regularity of fracture measurement | poor | poor | excellent | excellent |
| appearance of inner tube after fractured | sharp-edged cuts | sharp-edged cuts | complex fractures | complex fractures easy release |

(a) Hose 1 (Invention Example 1)

The process above described was used to make six sample hoses. Mandrel was not treated for releasing. Inner tubes were coated with an urethane adhesive (CHEMLOCK 250, Lord Far-East Inc.).

(b) Hose 2 (Invention Example 2)

The procedure for Hose 1 above was followed except that mandrel was treated. Six sample hoses were made.

(c) Hose 3 (Comparison Example 1)

The prior art process was carried out in which mandrel was inserted through a preformed inner tube to make six sample hoses. Mandrel was untreated. Inner tubes were coated with the same adhesive as in Hose 1.

(d) Hose 4 (Comparison Example 2)

The procedure for Hose 3 was followed except that mandrel was treated for releasability. Six sample hoses were made.

SPECIFICATION OF TEST HOSES plastic inner tube: polyamide 11 (RILSAN BESNO TL, Toray Industries)
rubber outer tube: CSM (HYPALON 40, DuPont)
reinforcement: rayon
rubber cover: CSM (same as in the outer tube)
mandrel: polyamide 11 (same as in the inner tube)

IMPULSE TEST

Impulse resistance was determined by the number of cycles of impulse required for test hoses to fracture completely throughout their plastic inner tubes, with the results tabulated. Test conditions were as follows:
internal diameter of hose: 11 mm
external diameter of hose: 19 mm
thickness of inner tube: 200$\mu$
oil temperature: 150° C.
ambient temperature: 20°–25° C. (room temperature)
maximum test pressure: 40 kg/cm$^2$
rate of cycle: 70 cpm, square wave as defined at SAE, J343 (June 1980)

It is to be noted as appears clear from the test results that both hoses representing Invention Examples 1 and 2 are quite satisfactory in respect of impulse resistance characteristics as evidenced by the cycles of impulse ranging from 135,000 to 221,000. The controls of Comparison Examples 1 and 2 fractured after only 36,000 cycles of impulse and revealed sharp cuts.

What is claimed is:

1. A process for the production of hoses having a plastic inner tube of reduced thickness, which comprises:
   (a) extruding a thin layer of polyamide or polyester resin onto a mandrel to form an inner tube having a thickness in the range between 50 and 800 microns, said mandrel being releasable from said inner tube and preformed of polyamide or polyester, or vulcanized ethylene-propylene terpolymer rubber, butyl rubber or chlorobutyl rubber;
   (b) laminating an outer tube of unvulcanized rubber by extrusion over said inner tube to form an integral hose body;
   (c) vulcanizing said hose body; and
   (d) removing said mandrel from said vulcanized hose body.

2. A process according to claim 1 further comprising reinforcing said outer tube with a reinforcement.

3. A process according to claim 2 further comprising laminating a cover of unvulcanized rubber by extrusion over said reinforcement.

4. A process according to claim 3 wherein said unvulcanized rubber is chlorinated polyethylene, chlorosulfonated polyethylene, ethylene-propylene rubber, butyl rubber or chlorobutyl rubber.

5. A process according to claim 2 wherein said reinforcement is made by braiding a textile yarn over said outer tube or by wrapping a fabric strip over the same, said textile yarn being nylon, polyester, vinylon or rayon.

6. A process according to claim 1 wherein prior to step (b), said inner tube is coated with an adhesive, said adhesive being polyurethane resin, chlorinated rubber or phenol resin.

7. A process according to claim 1 wherein prior to step (b), said unvulcanized rubber is blended with an adhesion promotor, said promotor being silicone resin or phenol resin.

8. A process according to claim 1 wherein said unvulcanized rubber in step (b) is nitrile rubber, chlorosulfonated polyethylene, epichlorohydrin rubber, chlorinated polyethylene ethylene-propylene rubber, butyl rubber or chlorobutyl rubber.

* * * * *